United States Patent [19]

Harpham

[11] Patent Number: 5,659,273

[45] Date of Patent: Aug. 19, 1997

[54] LINE TERMINATION FOR MULTIPLE DIFFERENTIAL TRANSMISSION LINES

[75] Inventor: Lewis Freeth Harpham, Wiltshire, United Kingdom

[73] Assignee: Madge Metworks Limited, Buckinghamshire, United Kingdom

[21] Appl. No.: 510,071

[22] Filed: Aug. 1, 1995

[30] Foreign Application Priority Data

Aug. 3, 1994 [GB] United Kingdom ............ 9415726
Oct. 25, 1994 [GB] United Kingdom ............ 9421475

[51] Int. Cl.⁶ .............................................. H01P 1/26
[52] U.S. Cl. ................. 333/22 R; 333/32; 333/177; 379/398; 379/416
[58] Field of Search .................... 333/22 R, 32, 333/177; 379/394, 398, 416

[56] References Cited

U.S. PATENT DOCUMENTS

| | | | |
|---|---|---|---|
| 3,757,168 | 9/1973 | Kreuzer | 361/88 |
| 3,778,759 | 12/1973 | Carroll | 367/43 |
| 4,751,607 | 6/1988 | Smith | 361/119 |
| 4,823,095 | 4/1989 | Atallah et al. | 333/22 R |
| 4,951,312 | 8/1990 | Tanikawa et al. | 379/394 |
| 5,020,102 | 5/1991 | Schorr | 379/398 X |
| 5,095,291 | 3/1992 | Staschover et al. | 333/12 |
| 5,321,372 | 6/1994 | Smith | 333/1 |

FOREIGN PATENT DOCUMENTS 0 495 178 A2   11/1991   European Pat. Off. .

OTHER PUBLICATIONS

Patent Abstracts of Japan, vol. 7 No. 84 (E–169) & JP–A–58 012 436, Apr. 1983.
A. W. Nicholson et al., "NPL Standard–Interface Module for Remote Data Transfer" *Electronics Letters*, vol. 2, No. 4, Apr. 1966, pp. 135–136.
EPO Standard Search Report, File RS 94580, Apr. 24, 1995.

Primary Examiner—Benny Lee
Assistant Examiner—Barbara Summons
Attorney, Agent, or Firm—Sughrue, Mion, Zinn, Macpeak & Seas

[57] ABSTRACT

A termination is provided for a differential transmission line such as unshielded twisted pair (UTP) to isolate a connected device from electromagnetic interference present on the UTP in the form of differential mode and common mode noise. An example of an electromagnetic interference isolator comprises a common mode and a differential mode termination, a common mode choke which exhibits substantially constant impedance over a wide bandwidth and a centre tapped isolation transformer.

13 Claims, 6 Drawing Sheets

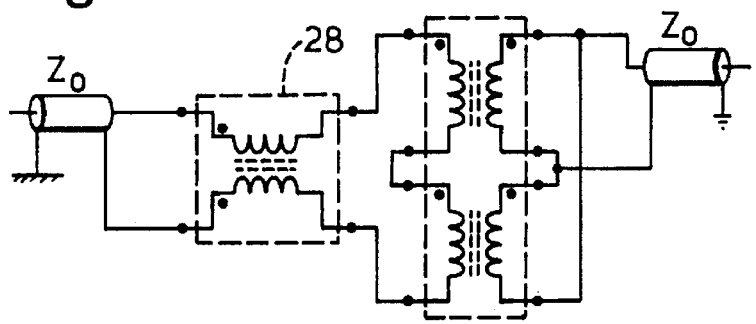
Fig.8A.
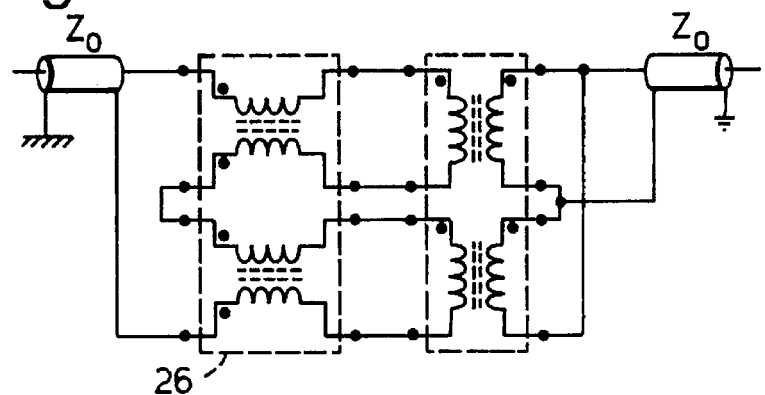
Fig.8B.
Fig.9. PRIOR ART.
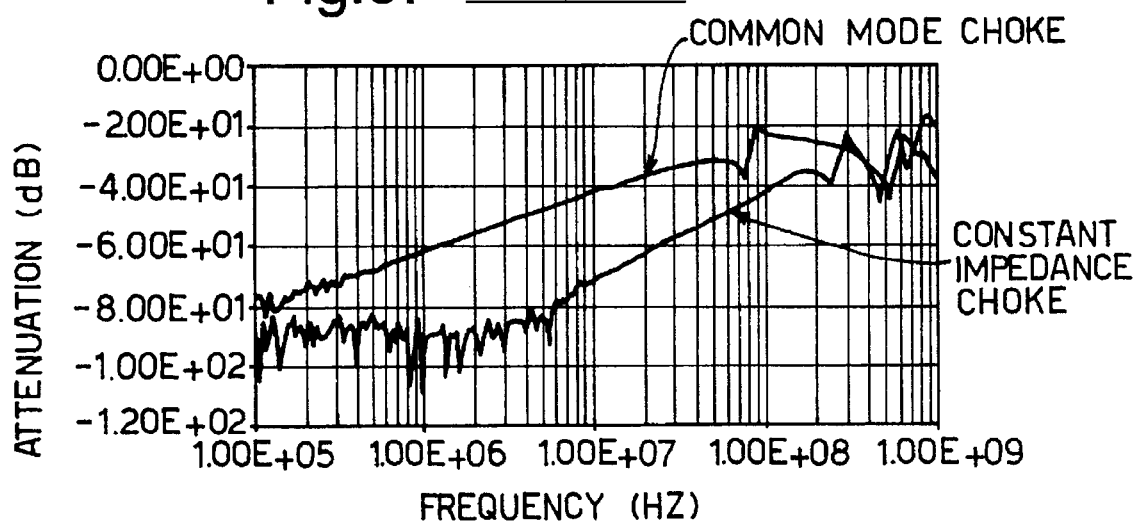

LINE TERMINATION FOR MULTIPLE DIFFERENTIAL TRANSMISSION LINES

TECHNICAL FIELD

The present invention relates to a termination for high frequency transmission lines to isolate a connected device from the effects of electromagnetic interference present on the transmission lines.

BACKGROUND ART

The transmission of information along a transmission path involves a transmission medium. Any change in impedance that a transmission medium presents to the transmission path will result in energy being reflected or dispersed in some way. An ideal transmission path will deliver all of its signal energy to a destination without any internal loss or corruption of that signal energy. One of the most efficient media for this task is coaxial cable. Unshielded twisted pair (UTP) is often used in place of coaxial cable to reduce costs.

In digital data transmission, small imperfections along the length of a transmission line cable can result in differential to common mode conversion of signal energy. This results in radiation of energy from the cable in the form of electromagnetic emission. Conversely, any common mode energy picked up by the cable will leak into the system due to common to differential mode conversion caused by the same imperfections in the cable. Energy loss in the transmission line cable is problematic at particular frequencies related to the fundamental and harmonic components of a transmitted signal. Energy pick up is exacerbated at frequencies which relate to the length of the transmission line. If an applied energy source is swept across a range of frequencies, energy radiates from the cable with a high efficiency at many discreet frequencies and their respective harmonics. That efficiency depends upon the fractional relationship between the length of the transmission line and the wavelength of the applied signal source. At other frequencies where the wavelength of the signal is odd multiples of $\lambda/8$, the radiation from the line drops to a low value. The improved electromagnetic interference performance for that transmission line is due to the fact that equal energy is contained in the electric field and magnetic field of the transmission line so the transmission line behaves as though it were terminated by an impedance equal to its "characteristic" impedance. This "terminated" condition is analogous to an infinite transmission line. If a transmission line is not correctly terminated, energy is reflected up and down the line to produce voltage and current "standing waves" on that line. As the energy passes certain points in the line it adds to either the magnetic or electric field, intensifying the electromagnetic field being radiated from that point. Similarly, the addition of further energy to the line from an external electro-magnetic field reinforces any energy already being reflected up and down the line due to earlier field pick-up. Accordingly, an increased sensitivity to external fields will occur along the transmission line at points which correlate to the standing wave patterns.

A particular problem occurs in signal lines or cables comprising multiple pairs of transmission lines such as those found in four pair UTP, typically used in token ring and telephony distribution networks in which not only is there coupling between the lines in one pair but also between pairs of lines.

Twisted pair is one of the most common transmission media used in communication networks and consists of two insulated copper wires, typically 1 mm thick, twisted together in the form of a helix. In larger communication networks, several pairs of twisted pairs are bundled together to form a single cable. IEEE Standard 802.5, the well known token ring network standard, is often implemented using twisted pair cable in which each twisted pair is electrically shielded to reduce the effects of electromagnetic emissions and interference. This shielding makes this type of twisted pair cable relatively expensive.

It is currently proposed to increase the bit rate of the local area network systems to a speed of up to 622 Mbit $s^{-1}$ and preferably use low grade unshielded twisted pair cable, being less expensive, for new installations and allow usage in existing installations. The unshielded twisted pair cable and higher transmission rate introduces electromagnetic emission and susceptibility problems which have to be overcome to meet International compatibility standards and to ensure the integrity of transmitted data.

The twisted pair, as a high frequency signal transmission line, has a characteristic impedance which, as noted above, must be matched to that of a load to which it is connected to ensure that the maximum signal power is transferred. If the characteristic impedance of the transmission line is not matched to the load then the transmitted signal received at the load will be reflected back along the transmission line which can then be emitted as electromagnetic signals along its length. The reflected signal will also tend to corrupt the incoming signal. If the reflected signal reaches the other end of the transmission line the signal will interfere with the source of the transmitted signal.

Another feature of a twisted pair is that it is susceptible to electromagnetic interference from many sources such as nearby power cables or even an adjacent twisted pair within a cable bundle. This electrical "pick-up" can appear as a common mode unwanted signal on each wire of the twisted pair transmission line, with respect to a distant reference point.

One known technique of rejecting common mode noise is the use of a pair of differential transmitter and receiver circuits. In this arrangement a differential transmitter circuit at one end of the transmission line produces two signals of equal and opposite polarity for every binary 1 or 0 signal to be transmitted and so transmits opposite polarity signals along the two wires of the twisted pair. The differential receiver, located at the other end of the transmission line, is only sensitive to the difference between the two inputs from the twisted pair so that any common mode energy picked up on both wires is rejected. In practice, even this technique is not wholly reliable due to imperfections in the helical winding of the twisted pair and the mutual inductance of the twisted pair. Also, it is practically impossible to balance the signals in the two wires of the twisted pair. Accordingly, it is often necessary to use shielded twisted pair cable to minimize emissions and electrical interference when transmitting digital data.

Common mode chokes are also typically used in termination circuits for transmission lines to reject unwanted common mode signals. In one application of a conventional common mode choke, a communications cable, such as twisted pair, carrying a differential signal, is wound around a ferrite toroid to increase the series inductance of the whole cable, thus raising the impedance to unwanted high frequency common mode signals. The model of a common mode choke is a series connected transformer. The transformer action ensures that the differential signal on the two wires appears at both ends of the device. A potential reduction of some 15 to 20 dB of common mode energy, with an insertion lost of some 0.5 dB for differential mode energy, can be obtained by the correct application of a common mode choke.

FIG. 10 shows the transformer model of an ideal common mode choke 28 as applied to a differential transmission line 29 with a double ended load $R_1$, $R_2$. In this ideal device, if a high frequency current source $i_1$ is applied to one of the two inputs of the common mode choke 28, it forces a current through the upper winding 30 of the common mode choke and across the load resistor $R_1$, developing a voltage $v_1$. A similar current $-i_1$ is induced in the lower winding 31 of the common mode choke, so developing a negative voltage $-v_1$ across load resistor $R_2$. A high frequency current source $i_2$ applied to the other input develops a voltage $v_2$ across load $R_2$ and induces a negative voltage $-v_2$ across the load resistor $R_1$.

Accordingly, if $i_1=i_2$ then $v_1=v_2$ and providing $R_1=R_2$ then all the currents and voltages cancel so that the common mode impedance looking into the input side of the common mode choke appears infinite for all frequencies. However, if $i_1$ and $i_2$ are not equal, as is the case for differential data signals, then the difference in current develops an equal voltage across both load resistors and therefore the common mode choke appears as a short circuit between the current source and load.

The performance of a practical common mode choke is in fact limited by the parasitic elements of the device. Common mode rejection is dominated by the core characteristics and at higher frequencies the permeability and inductance of the core decreases so that the impedance does not appear infinite for all frequencies. Lower frequency common mode signals carried by the windings contribute significantly to the magnetic flux of the core causing the core to saturate at relatively low levels of common mode energy. In practice, a current shunt path to ground is provided to partially compensate for this but the maximum available rejection is still rather limited.

In the present application, the term "differential transmission line" is to be understood to mean a double ended signal line in which each signal path has a differential data signal imposed upon it. Accordingly, the present invention is not limited to the field of communication systems but also has applications in high frequency apparatus, and in particular electrical consumer goods. Examples of suitable transmission lines are shielded twisted pair, unshielded twisted pair, flat ribbon cable, twin core cable, PCB microstrip transmission lines and pairs of conventional co-axial cables.

DISCLOSURE OF INVENTION

According to a first aspect of the present invention, a termination for two or more differential transmission lines, in which each transmission line is terminated to ground by a differential mode termination resistance substantially equal to a characteristic differential impedance for that transmission line and adjacent transmission lines are terminated to ground by a common mode termination resistance substantially equal to a characteristic common mode impedance for those adjacent transmission lines.

The present invention provides a characteristic termination for both differential mode and common mode energy and so limits the susceptibility of the transmission line to electro-magnetic interference. The invention provides the correct impedance match termination for both wanted differential signals which are to be presented to a communication port, whilst providing a path to ground for unwanted common mode noise signals.

It is preferred that the termination for each transmission line comprises a first resistor and a second resistor connected in series between the two paths of the transmission line, where each resistor has a preferred resistance of substantially half the value of a known characteristic differential mode impedance, $Z_{DM}$, for that transmission line. The termination further comprises a third resistor having its input connected to a point between the first and second resistors and its output connected to ground, wherein the third resistor has a preferred resistance substantially equal to, $$\frac{Z_{CM}}{2} - \frac{Z_{DM}}{4}$$

where $Z_{CM}$ is the characteristic common mode impedance measured between two adjacent differential transmission lines.

A typical communication port such as that used in a token ring network utilises an isolation transformer to magnetically couple a wanted differential data signal between a connected device, such as printed circuit board, and a differential transmission line. However, the high frequency performance of a conventional isolation transformer is poor due to a leakage inductance of the transformer. In particular, at higher frequencies, such as 125 MHz, a conventional isolation transformer behaves as a single series inductor which displays an increasing reactance with frequency hence an increasing differential mode reflection coefficient. It is important to compensate for the rising impedance of the isolation transformer which would otherwise adversely effect the impedance matching function of the termination.

According, to a second aspect of the present invention, a differential transmission line termination which includes an isolation transformer connected to signal outputs of the termination, in which the termination further comprises a conjugate match circuit to compensate for the leakage inductance of the isolation transformer.

A conjugate match circuit provides a current shunt path to ground at high frequency and comprises a series connected resistor and capacitor, where the preferred value of the capacitance is selected to provide a reactance substantially equal in magnitude to that of the reactance of the transformer at high frequency, but of opposite polarity. This ensures that the differential mode signal is terminated properly when the transmission line is connected to an isolation transformer.

In the differential transmission line termination of the first aspect of the present invention, it is preferred that the RC conjugate match of the second aspect of the present invention is combined with the resistive termination network described above, so that the one path of the differential transmission line includes a first capacitor connected in series with the first resistor and the other path includes a second capacitor connected in series with the second resistor, and in each path, the series connected resistor and capacitor are connected in series to a common input of the third resistor and the output of the third resistor is connected to ground. The value of the capacitance of each of the first and second capacitors is substantially equal to twice the capacitance required to provide a conjugate match for the isolation transformer leakage inductance because the two capacitors are effectively connected in series.

In a uni-directional system only the transmission line side of the termination requires a conjugate match, the capacitance being matched to the leakage inductance of the isolation transformer winding on the transmission line side. In a bi-directional system, a further conjugate match should be provided on the internal line side of the isolation transformer, the capacitance being matched to the leakage inductance of the other winding of the isolation transformer.

The addition of an RC conjugate match to the termination circuit ensures that the differential mode signal is correctly terminated for all frequencies. However, the common mode termination is now only effective at high frequency due to the electrical characteristics of the capacitors in the shunt path. In most applications it is necessary to provide the correct common mode termination across a wide band of frequencies.

According to a third aspect of the present invention, an isolation transformer for use in a differential transmission line termination for two or more adjacent transmission lines, in which a transformer winding on the transmission line side of the transformer is provided with a centre tap connected to ground via a common mode termination resistance.

The common mode termination resistance ensures that low to medium frequency common mode signals are correctly terminated. In a first example where there is a single centre tap from the isolation transformer, preferably, the common mode termination resistance has a value substantially equal to $Z_{CM}/2$, where $Z_{CM}$ is the characteristic common mode impedance between two adjacent transmission lines. In a second example, the centre tap is split into two independent paths and preferably each path is connected to ground via a common mode termination resistance having a value substantially equal to $Z_{CM}$.

Preferably, the isolation transformer of the third aspect of the present invention is connected to the signal outputs of a combined transmission line termination including the first and second aspects of the present invention to provide common mode and differential mode termination for all in-band and out-of-band signals, whilst providing an isolation barrier between the transmission line and a connected device. The combination of the termination and isolation transformer provide a wide band rejection of common mode energy with minimal insertion loss. This is due to better control of broad band common mode and differential mode impedances for the transmission line terminations for a range of frequencies from, for example, 100 KHz to 300 MHz.

According to a fourth aspect of the present invention, a common mode choke comprises:

a first series connected transformer comprising a core and primary and secondary windings wound around the core; and, a second series connected transformer comprising a core and primary and secondary windings wound around the core, wherein, in use, with a respective load applied across the outputs of the primary and secondary windings of each of the first and second transformers and each input of each secondary winding connected to ground, the common mode choke appears as a substantially constant impedance to any differential mode component of signals applied to the primary windings of the first and second transformers whilst attenuating any common mode component.

Ideally, it would be desirable to include a conventional common mode choke in the combined termination circuit to attenuate high frequency common mode signals which are out of band with respect to the isolation transformers frequency response, but for the reasons discussed above, the practical performance of the conventional common mode choke is rather limited by parasitic elements and core saturation. Furthermore, the use of a conventional common mode choke with the isolation transformer of the third aspect of the present invention is not recommended since the centre tap return path of the isolation transformer will introduce an interference path between frame ground and the PCB ground plane.

In the common mode choke of the present invention, two signal paths are used to carry common mode energy and each path passes through its respective core twice, but in opposite directions i.e. once through the primary winding and then through the secondary winding, thereby minimising the flux within the core due to the common mode energy. Accordingly, the choke has the ability to maintain a substantially constant load impedance across its input terminals to differential mode signals over a wide range of frequencies. In view of this hereinafter we term the choke of the present invention a "constant impedance choke". The constant impedance choke provides around 50 dB reduction in common to differential mode conversion or differential to common mode conversion.

The two cores of the choke may be physically separate from one another but preferably they are joined together in the form of a binocular core. In this type of core, whilst the two cores are physically joined together, they still maintain their magnetic independence.

According to a fifth aspect of the present invention, a differential transmission line termination circuit comprising a common mode choke according to the fourth aspect of the present invention and an isolation transformer according to the third aspect of the present invention, in which a signal from one path of the differential transmission line is connected to an input of the primary of the first series connected transformer and a signal from the other path of the differential transmission line is connected to an input of the primary of the second series connected transformer, a first primary winding of the isolation transformer is connected across the outputs of the first transformer and a second primary winding of the isolation transformer is connected across the outputs of the second transformer and the secondary winding of each of the first and second transformers is connected to ground via a common mode termination resistance.

The combination of the common mode choke and isolation transformer of the present invention gives a rejection of common to differential mode conversion, and vice versa, of 70 dB or more.

In this arrangement, the load across each series connected transformer of the constant impedance choke is one half of the split primary winding of the isolation transformer.

BRIEF DESCRIPTION OF DRAWINGS

The present invention will now be described with reference to the following drawings in which:

FIGS. 8A and 8B show test circuits used to demonstrate the improved performance of the EMI isolator of the present invention over a conventional EMI isolator;

FIG. 9 shows a graph illustrating the common mode rejection performance of the test circuits of FIGS. 8A and 8B.

DETAILED DESCRIPTION

Figure 1:
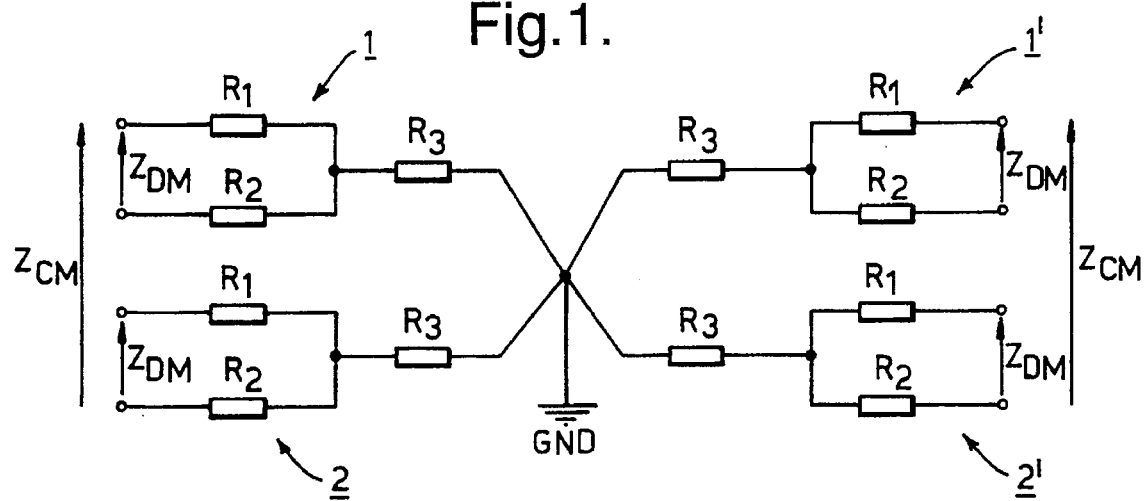
FIG. 1 shows an impedance matched termination circuit for four pair UTP cable.

FIG. 1 shows a resistive termination network for four pair UTP, typically used in transmission lines and telephony distribution networks. The impedance measured between the two paths of any one transmission line 1, 2, 1', 2' is known as the differential mode impedance, $Z_{DM}$, and in this example the manufacturers specifications state this to be 100 ohms ± 10 ohms. The impedance between transmission line 1 or 1', respectively, and adjacent transmission line 2 or 2', respectively, known as the common mode impedance $Z_{CM}$, was measured as substantially 100 ohms. This value is dependent upon the physical geometry between the wires in each pair and the bundling of all the pairs.

Each of the transmission lines 1 and 2 must each be terminated by their characteristic differential mode impedance, $Z_{DM}$, and the pair of transmission lines must be terminated by their characteristic common mode impedance, $Z_{CM}$ irrespective of whether or not both transmission lines are actually used. The preferred series resistance value of the two resistors $R_1$ and $R_2$ shown in FIG. 1 is selected to match the differential mode impedance and hence each has to have a preferred resistance value of 51 R, which is substantially half the differential mode impedance. Accordingly, the combined resistance is substantially 100 ohms which meets the differential mode impedance matching requirement for the transmission line.

The combined resistance across the resistive networks comprising resistors $R_1$, $R_2$ and $R_3$ of each transmission line 1 or 2 to ground must be substantially equal to half the common mode impedance, $Z_{CM}$. The impedance between the two transmission lines must comprise two networks consisting of $R_1$ in parallel with $R_2$ plus $R_3$ to ensure that there is also a correct impedance match for common mode signals. The common mode impedance, $Z_{CM}$ may be expressed by the equation:

$$Z_{CM} = 2\left[\left(\frac{1}{R_1} + \frac{1}{R_2}\right)^{-1} + R_3\right]$$

which may be rewritten as:

$$R_3 = \frac{Z_{CM}}{2} - R_1\frac{R_2}{R_1 + R_2}$$

but since in this case, $$R_1 = R_2 = \frac{Z_{DM}}{2},$$

$$\rightarrow R_3 = \frac{Z_{CM}}{2} - \frac{Z_{DM}}{4}$$

Accordingly, substituting the values $Z_{DM}$=100 ohms and $Z_{CM}$=100 ohms into the above equation gives $R_3$=25 ohms, or using preferred resistor values, $R_3$=24 R.

This resistive network provides a characteristic termination for both differential mode and common mode energy and so limits the susceptibility of the transmission lines in the UTP cable bundle to electromagnetic interference. The termination provides the correct impedance match for both in-band differential signals which are to be presented to a communication port, whilst providing the correct termination impedance for the initial common mode signals as well as the out-of-band differential and common mode noise signals. No provision needs to be provided for a termination between the diagonally opposite pairs 1,2' and 2, 1' of the UTP transmission lines in the bundle since they are partially shielded from one another by the two adjacent pairs in the bundle and contribute little to the condition of energy. The effective termination is the impedance between any one pair and the three others, which in this case is 66 ohms.

Figure 2:
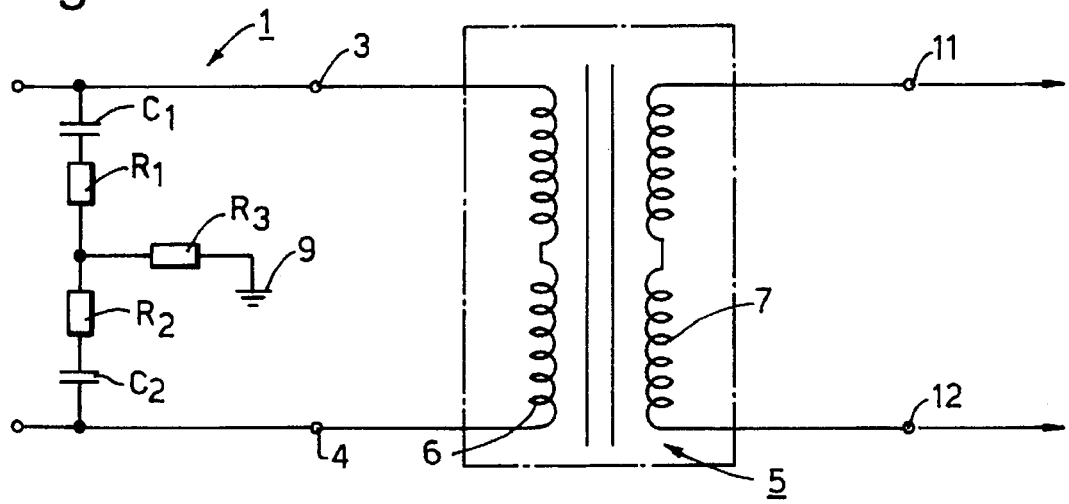
FIG. 2 shows a termination for one of a number of UTP in a cable in which the termination includes an isolation transformer.

FIG. 2 shows the termination circuit for one transmission line 1 of a cable bundle (not shown) comprising two or more UTP transmission lines in which the signal outputs 3, 4 are connected to the transmission line side winding 6 of an isolation transformer 5. At high frequencies, the isolation transformer presents a frequency dependent reactance which adversely effects the performance of the differential mode termination. In the present invention, this is compensated for by the use of an RC conjugate match in the termination circuit. Preferred values of the resistors $R_1$, $R_2$ and $R_3$ are not affected but the circuit now includes a pair of capacitors $C_1$, $C_2$ which have their own frequency dependent reactance.

The shunt path to frame ground 9 for each path of the transmission line 1 via the capacitors $C_1$, $C_2$, respectively, compensates for the high frequency performance of the isolation transformer 5. The series capacitance of the two capacitors $C_1$, $C_2$ is selected to provide a conjugate match for the high frequency leakage inductance of the isolation transformer 5, where the series reactance of the capacitors $C_1$, $C_2$ is equal in magnitude to that of the reactance of the transformer at high frequency, but of opposite polarity. Accordingly, the value of each capacitor $C_1$, $C_2$ must each be twice the value of the required conjugate match capacitance because the two capacitors are connected in series. In this example a Bel 5553-3006-DO transformer was found to have a leakage inductance of 80.5 nH at 179.9 MHz. Accordingly, the ideal conjugate match would be a 9.7 pF capacitor in series with a 100 Ω resistor. However, using preferred values the capacitance is 11 pF so that $C_1$=$C_2$=22 pF.

In a uni-directional system only the transmission line side of the termination requires a conjugate matche, the capacitance being matched to the leakage inductance of the isolation transformer winding 6 on the transmission line side. In a bi-directional system, a further conjugate match may be provided on the internal line side of the isolation transformer, the capacitance being matched to the leakage inductance of other winding 7 of the isolation transformer.

Addition of an RC conjugate match to the termination circuit ensures that the differential mode signal is correctly terminated for all frequencies. However, the common mode termination is now only effective at high frequency due to the electrical characteristics of the capacitors in the shunt paths. In many applications this is not a problem, but in some it is necessary to provide the common mode termination across a wide band of frequencies.

Figure 3:
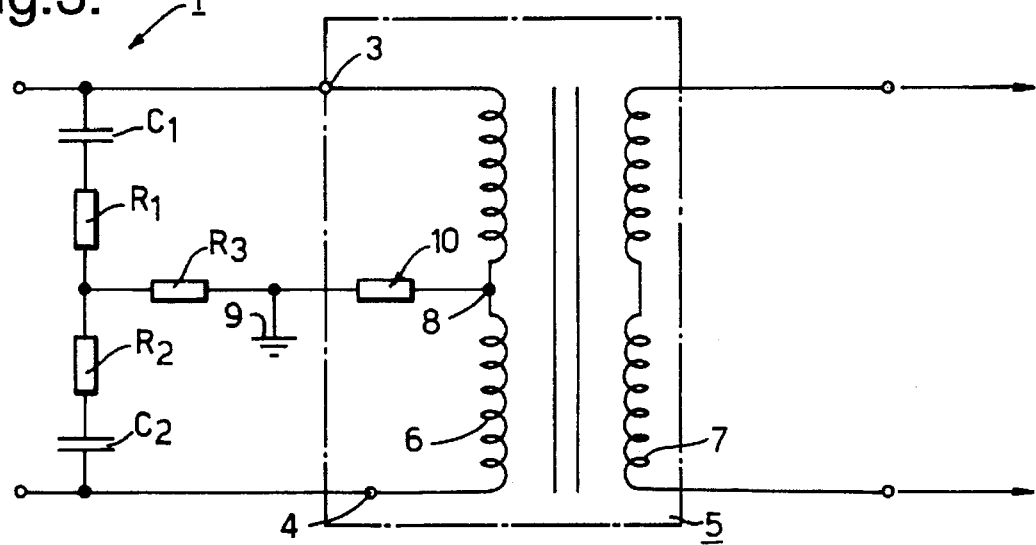
FIG. 3 shows the termination of FIG. 2 which has been modified to provide wide band termination for both common mode and differential mode signals present on the UTP transmission line.

FIG. 3 shows a termination in which the isolation transformer 5 of FIG. 2 is modified to provide in-band common mode termination.

The winding 6 of the isolation transformer 5 is provided with a centre tap 8 connected to frame ground 9 via the in-band common mode termination resistor 10. The common mode termination resistor 10 has a resistance substantially equal to $Z_{CM}/2$.

The adjacent transmission line 2 (see FIG. 1) is also terminated in the same manner and so the combination provides the correct common mode termination for a wide band of frequencies.

A similar termination network (not shown) can be developed for termination of differential and common mode out of band energy for the internal line side of the termination, which may, for example, be connected to a PCB.

Figure 4:
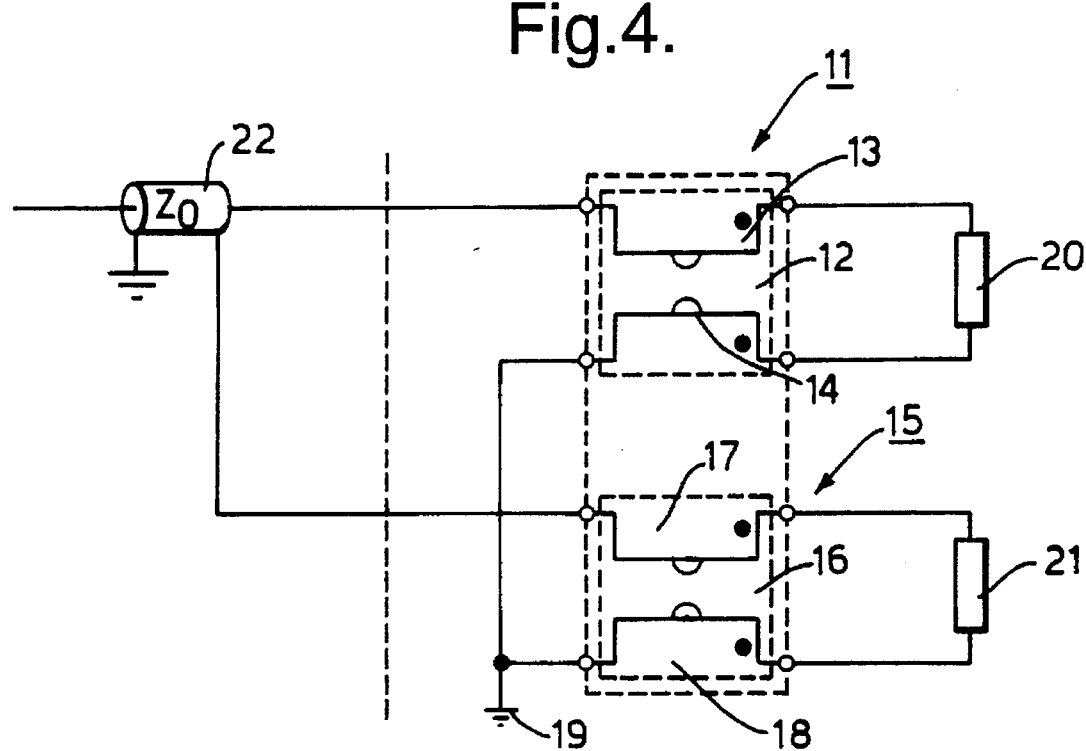
FIG. 4 shows a model of a constant impedance choke in accordance with the present invention.
Figure 10:
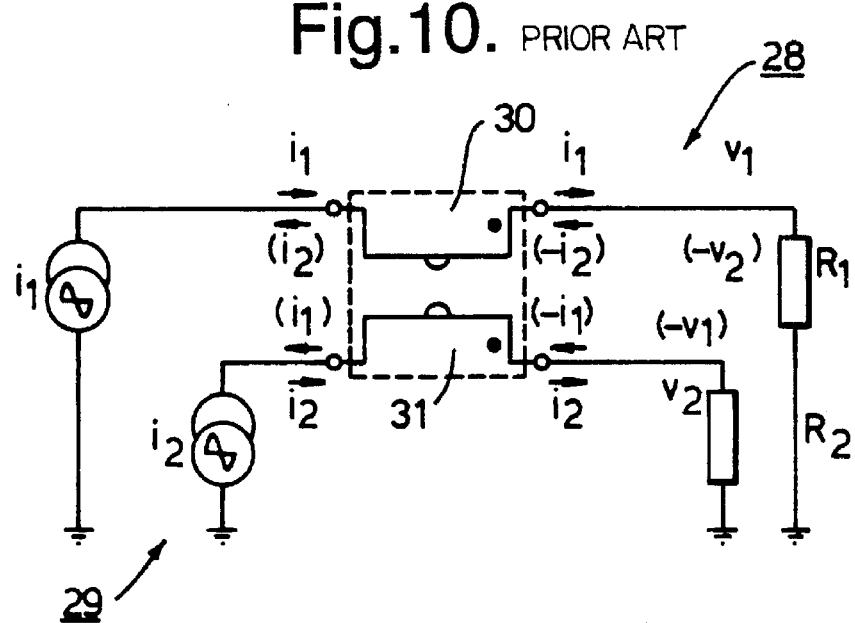
FIG. 10 shows a model of a conventional common mode choke.
Figure 5A:
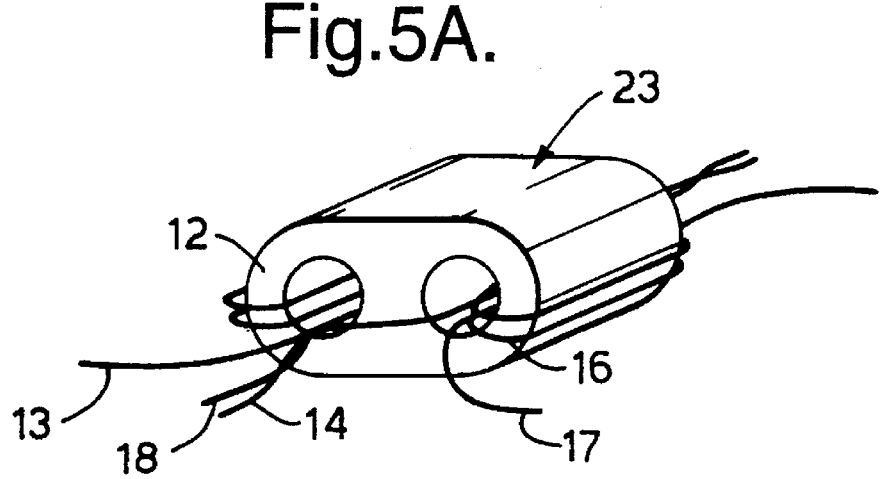
FIGS. 5A to 5C show an example of the winding arrangement of the constant impedance choke of the present invention.
Figure 5B:
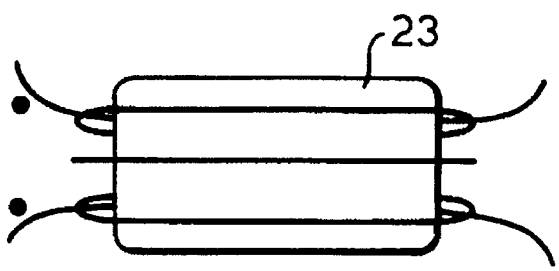
Figure 5C:
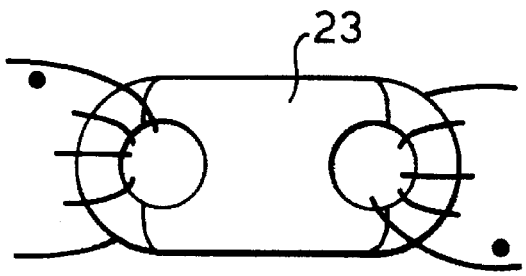

FIG. 4 shows a constant impedance choke. The constant impedance choke comprises a first series connected transformer 11 having a core 12 and primary winding 13 and secondary winding 14 wound around the core 12. The constant impedance choke further comprises a second series connected transformer 15 having a core 16 and a primary winding 17 and secondary winding 18 wound around the core 16. In this example, the two cores 12 and 16, respectively, are formed as an integral binocular type core as shown in FIGS. 5A to 5C, whereby the two limbs of the binocular core are magnetically independent of each other even if physically joined.

In use, the secondary windings 14 and 18 of each of the first and second transformers 11 and 15, respectively, are connected to a frame ground 19 or other suitable reference point. Loads 20 and 21, respectively, are connected across the outputs of the primary and secondary windings of the first and second transformers 11 and 15, respectively. In this example, a Category 5 UTP transmission line 22 is connected to the two primary windings 13 and 17 of the constant impedance choke. The cores 12 and 16 in this example are each a Ferronics 12-340 core, type K material, which are adhered together to form a single binocular core 23 (see FIG. 5). The windings of the transformers 11 and 15 are designed for a nominal 50 ohms to suit Category 5 UTP and are made from a twisted pair of 38 AWG "road runner" wire with 12 μm QSE polyurethane coating and twisted at a rate of 3 twists per centimetre of wire length. As shown in FIGS. 5A to 5C, these bifilar windings are wound around the binocular core 23 such that the sense of their windings would be in phase if the core was made of non-magnetic material. Although not shown fully in the figures, there are seven turns on each limb of the core occupying 90° of angle. Two separate cores could be used, but a single binocular core 23 is preferred to reduce non-uniformity in the core materials and to maintain physical rigidity in the completed structure. The aim is to maintain the transmission line performance of the windings through the low capacitance isolation barrier provided by the core. This concept is not restricted to one or two signals but can be applied to many in parallel.

Any differential mode component of a signal carried by the differential transmission line 22 passes through the constant impedance choke with only around −0.1 dB insertion loss. The constant impedance choke of the present invention maintains a constant load impedance across its input terminals up to very high frequencies and effectively appears as a transmission line to differential mode signals. Any low to medium frequency common mode component of the applied signal will also tend to pass through the choke without being attenuated to any significant degree as the reactance of the inductors formed by the coiled windings of the transformer are proportional to the frequency of the applied signal. In other words, these signals are "out of band" with respect to the frequency response of the constant impedance choke. However, unlike the conventional common mode choke, in the present invention the return path of the signal is via the secondary winding 14 and 18 of each of the transformers 11 and 15, respectively to frame ground 19 and this has the effect of minimising the flux within each core 12 and 16 due to any common mode component of the applied signal. This flux cancellation prevents the core saturating. Accordingly, high frequency common mode components of the applied signal are significantly attenuated by the series inductance formed by the primary and secondary windings of each series connected transformer, the attenuation becoming progressively greater with increasing frequency. As the core of each transformer remains unsaturated to very high frequencies, the constant impedance choke operates effectively over a very wide bandwidth.

Figure 6:
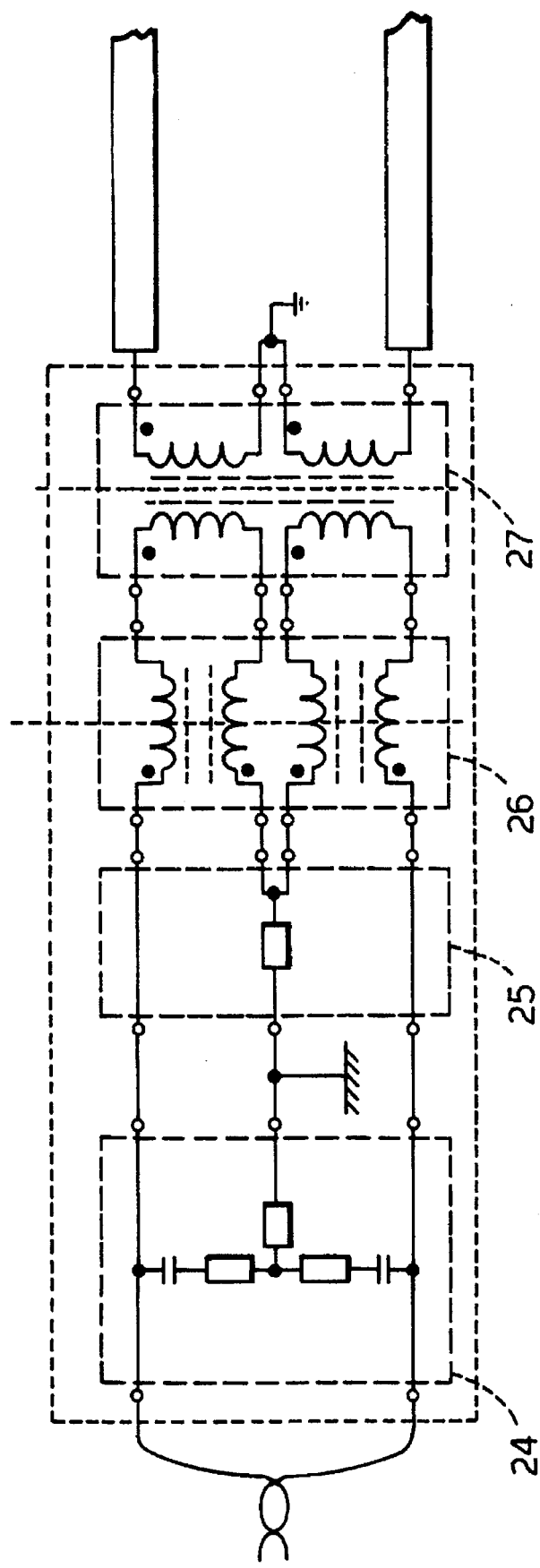
FIG. 6 shows a first example of an EMI isolator.

Whilst alone, the constant impedance choke of the present invention provides attenuation of high frequency common mode signals, the invention may be advantageously combined with the transmission termination circuits described above to provide a complete EMI isolator which exhibits better rejection of common mode energy whilst conducting a wider band of differential mode energy than that of any commercially available device. In fact, the combination is synergistic in that the common mode rejection of the complete EMI isolator is greater than that of the sum of the theoretical rejection contributed by each individual part. FIG. 6 shows a first example of a complete EMI isolator. The EMI isolator comprises a high frequency common and differential mode termination 24, a low frequency common mode termination 25, a constant impedance choke 26 and an isolation transformer 27. In this example, the constant impedance choke 26 is connected between the low frequency common mode termination 25 and isolation transformer 27. In the second example shown in FIG. 7, the constant impedance choke 26 is positioned between the low frequency common mode termination 25 and the high frequency differential mode termination 24. Generally speaking, the constant impedance choke 26 passes differential mode signals together with lower frequency common mode signals which are "out of band" with respect to the frequency response of the constant impedance choke. The lower frequency common mode signals passed by the constant impedance choke are subsequently attenuated by the isolation transformer as these signals are "in band" with respect to the frequency response of the transformers. Accordingly, the combination of the constant impedance choke and isolation transformer of the present invention attenuates common mode signals across an extremely wide bandwidth.

Figure 7:
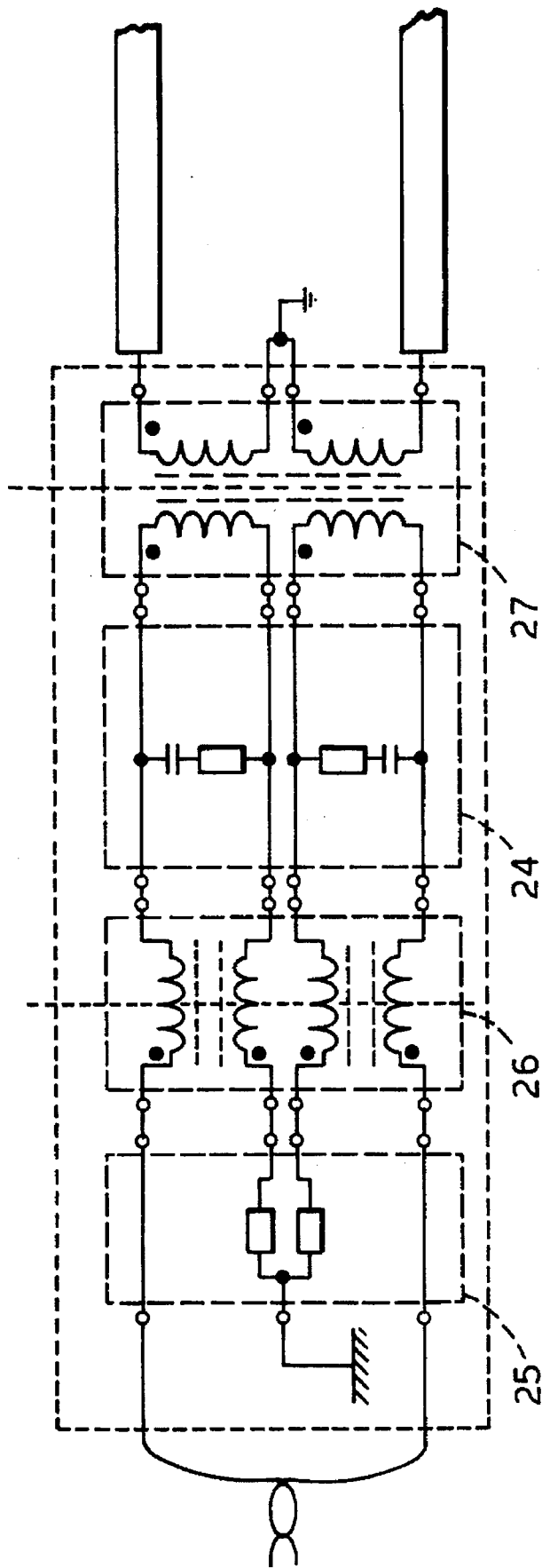
FIG. 7 shows a second example of an EMI isolator.

The EMI isolator circuit in FIG. 7 optimises the differential mode performance at higher frequencies with only a slight compromise in the common mode performance. The low frequency common mode termination 25 is shown as a split termination which ensures that the circulated currents through each half of the constant impedance choke 26 remain balanced for all manufacturing tolerances of the EMI isolator. Application of the EMI isolator is not restricted to the line side of the host unit. In a bi-directional system it can also be applied to the host unit by reversing the circuits in FIGS. 6 or 7, such that a "zero" common mode impedance is presented to the transmission line and the "correct" common mode impedance is presented to the host system. The unit can also be used to control conducted emissions across the same piece of equipment and between stages.

To demonstrate the improvement in common mode rejection that can be obtained with the constant impedance choke of the present invention, the two test circuits of FIGS. 8A and 8B were constructed and measurements of the differential to common mode conversion obtained. The results of the common mode rejection measurement for the constant impedance choke and the conventional common mode choke can be seen in FIG. 9. Some 30 dB improvement is possible at 10 MHz, with 20 dB at 100 MHz. Most of the low frequency improvement can be attributed to the improved isolation transformer with the centre tap connected to frame ground via the constant impedance choke and low frequency common mode termination, whereas the high frequency performance is dominated by the constant impedance choke of the present invention.

We claim:

1. A termination for two or more differential transmission lines, in which each of said transmission lines has two signal paths and is terminated to a ground by a differential mode termination resistance substantially equal to a characteristic differential impedance ($Z_{DM}$) for said transmission line and adjacent ones of said transmission lines are terminated by a common mode termination resistance substantially equal to a characteristic common mode impedance ($Z_{CM}$) for said adjacent transmission lines.

2. A differential transmission line termination according to claim 1, in which said termination for each of said transmission lines comprises a first resistor and a second resistor connected in series between said two signal paths of said transmission line, where each of said first and second resistors has a preferred resistance of substantially half the value of said characteristic differential mode impedance ($Z_{DM}$) for said transmission line.

3. A differential transmission line termination according to claim 2, in which said termination further comprises a third resistor having an input connected to a point between said first resistor and said second resistor and an output connected to ground, wherein said third resistor has a resistance substantially equal to, $$\frac{Z_{CM}}{2} - \frac{Z_{DM}}{4}.$$

4. A differential transmission line termination according to claim 2, wherein one of said two signal paths of said differential transmission line includes a first capacitor connected in series with said first resistor and the other of said two signal paths includes a second capacitor connected in series with said second resistor.

5. A differential transmission line termination according to claim 1, further comprising an isolation transformer and an RC conjugate match circuit which compensates for a leakage inductance of said isolation transformer.

6. A differential transmission line termination according to claim 5, further comprising a transformer winding on a transmission line side of said isolation transformer, said transformer winding being provided with a centre tap connected to ground via a common mode termination resistance.

7. A differential transmission line termination according to claim 6, wherein said common mode termination resistance has a value substantially equal to $Z_{CM}/2$.

8. A differential transmission line termination according to claim 6, wherein said centre tap is split into two paths, each one of said two paths being connected to ground via a common mode termination resistance having a value substantially equal to $Z_{CM}$.

9. A differential transmission line termination according to claim 1, further comprising a common mode choke which comprises:

a first series connected transformer comprising a core, a primary winding and a secondary winding, said primary winding and said secondary winding being wound around the core; and a second series connected transformer comprising a core, a primary winding and a secondary winding, said primary winding and said secondary winding being wound around the core, wherein, in use, with a respective load applied across an output of said primary winding and said secondary winding of each of said first series connected transformer and said second series connected transformer and an input of each of said secondary windings connected to a ground, said common mode choke appears as a substantially constant impedance to any differential mode component of signals applied to an input of said primary windings of said first series connected transformer and said second series connected transformer while attenuating an in-band common mode component.

10. A differential transmission line termination according to claim 9, wherein said core of said first series connected transformer and said core of said second series connected transformer are joined together in the form of a binocular core.

11. A differential transmission line termination according to claim 9, wherein said core of said first series connected transformer and said core of said second series connected transformer are physically separate from one another.

12. A differential transmission line termination according to claim 9, further comprising an isolation transformer having a first primary winding and a second primary winding, wherein a signal from one of said two signal paths is connected to said input of said primary winding of said first series connected transformer and a signal from the other of said two signal paths is connected to said input of said primary winding of said second series connected transformer, said first primary winding of said isolation transformer is connected across said outputs of said first series connected transformer and said second primary winding of said isolation transformer is connected across said outputs of said second series connected transformer and said secondary winding of each of said first series connected transformer and said second series connected transformer is connected to ground via said common mode termination resistance.

13. A differential transmission line termination according to claim 12, further comprising an RC conjugate match circuit which compensates for a leakage inductance of said isolation transformer.

* * * * *